United States Patent
Choi et al.

(10) Patent No.: US 7,889,705 B2
(45) Date of Patent: Feb. 15, 2011

(54) MOBILE TERMINAL AND METHOD FOR NOTIFYING ACCESS ROUTER OF IP ADDRESS IN WIRELESS NETWORK

(75) Inventors: Jin-Hyeock Choi, Suwon-si (KR); Hee-Jin Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 791 days.

(21) Appl. No.: 11/822,068

(22) Filed: Jul. 2, 2007

(65) Prior Publication Data

US 2008/0025253 A1 Jan. 31, 2008

Related U.S. Application Data

(60) Provisional application No. 60/833,843, filed on Jul. 28, 2006.

(30) Foreign Application Priority Data

Nov. 14, 2006 (KR) ...................... 10-2006-0112115

(51) Int. Cl.
*H04W 4/00* (2009.01)
*H04L 12/28* (2006.01)
*H04J 3/24* (2006.01)

(52) U.S. Cl. .................. 370/338; 370/389; 370/349

(58) Field of Classification Search .............. 370/338, 370/389, 349
See application file for complete search history.

(56) References Cited

U.S. PATENT DOCUMENTS

| | | | |
|---|---|---|---|
| 6,917,618 B2 | 7/2005 | Thubert et al. | |
| 6,925,087 B2 | 8/2005 | Inoue | |
| 2004/0081122 A1* | 4/2004 | Koodli et al. | 370/329 |
| 2005/0036471 A1* | 2/2005 | Singh et al. | 370/338 |
| 2005/0265360 A1* | 12/2005 | Kim et al. | 370/400 |

FOREIGN PATENT DOCUMENTS

| | | |
|---|---|---|
| EP | 1 394 999 A1 | 3/2004 |
| EP | 1 408 666 A1 | 4/2004 |
| JP | 2002-271420 | 9/2002 |
| JP | 2002-368790 | 12/2002 |
| JP | 2003-348174 | 12/2003 |
| JP | 2005-012620 | 1/2005 |
| KR | 10-2005-0039375 | 4/2005 |

* cited by examiner

*Primary Examiner*—Jinsong Hu
*Assistant Examiner*—Marisol Figueroa
(74) *Attorney, Agent, or Firm*—NSIP Law

(57) ABSTRACT

A mobile terminal and method of notifying an access router of an Internet protocol (IP) address of the mobile terminal in a wireless network are provided where a mobile terminal notifies an access router of an IP address of the mobile terminal, performing duplicate address detection (DAD) with respect to an automatically-configured IP address are performed, and a notification message including the IP address resulting from the performing of the DAD are transmitted to the access router. The access router is notified by using the notification message. The mobile terminal uses the IP address, based on whether there is a response with respect to the notification message transmitted to the access router after the performing of the DAD.

12 Claims, 5 Drawing Sheets

MOBILE TERMINAL AND METHOD FOR NOTIFYING ACCESS ROUTER OF IP ADDRESS IN WIRELESS NETWORK

CROSS-REFERENCE TO RELATED APPLICATIONS

This application claims the benefit under 35 U.S.C. §119(e) of a U.S. Provisional Application No. 60/833,843, filed on Jul. 28, 2006, in the U.S. Patent and Trademark Office, and under 35 U.S.C. §119(a) of a Korean Patent Application No. 10-2006-0112115, filed on Nov. 14, 2006, in the Korean Intellectual Property Office, the entire disclosure of both of which are hereby incorporated by reference.

BACKGROUND OF THE INVENTION

1. Field of the Invention

The present invention relates to a wireless network. More particularly, the present invention relates to a mobile terminal and method of notifying an access router of an Internet protocol (IP) address of the mobile terminal in a wireless network, which can automatically configure a reliable IP version 6 (IPv6) address and use the IPv6 address.

2. Description of Related Art

Generally, an Internet protocol version 6 (IPv6)-based network has been used for data communications between mobile terminals and communication nodes in a wired/wireless communication network. Since IPv6 corresponds to an address system of 32 bits, addresses which may be allocated for use with the Internet are increasing and are becoming scarce in the IPv6-based network. Accordingly, Internet engineering task force (IETF) standardized IPv6 using an address system of 128 bits.

Similar to the description above, since it is difficult that a user manually configures an IP address as IP address systems increase. Efforts are required to be exerted for automatically allocating the IP address via interactions between mobile terminals and communication nodes in the IPv6-based network.

An IPv6 address is generally allocated in mobile terminals according to three methods as described below. Specifically, the three methods correspond to i) a static configuration method configuring network information in each host by hand, ii) a dynamic configuration method providing a host with network information by using a network protocol such as a dynamic host configuration protocol (DHCP) according to a request, and iii) an automatic configuration method configuring network information according to a policy determined by a rule between all hosts in a network.

The dynamic configuration method is also referred to as a "statefull auto-configuration method" using a server such as the DHCP, and obtaining an address, where any one of the addresses which may be allocated in the server is allocated to a host side when a host side makes a request for an address to a DHCP server. Accordingly, the server is required to have a large-scale database, and be strictly managed.

The automatic configuration method is also referred to as a "stateless auto-configuration method" which a host side spontaneously generates an address. Specifically, the automatic configuration method generates an address using interface identification (ID) information of the host side, prefix information obtained from a router, or well-known prefix information. Therefore, the host is responsible for generating and allocating the address of the host.

However, since it is required that the access router in the network should manage all IP addresses which a mobile terminal uses, a problem may occur in operating the network when the access router is unaware of an automatically-configured IP address although the mobile terminal configures the IP address spontaneously and automatically.

Therefore, a mobile terminal and method of notifying an access router of an IP address of the mobile terminal in a wireless network, which can automatically configure a reliable IPv6 address, and use the IPv6 address is required.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a mobile terminal and method of notifying an access router of an Internet protocol (IP) address of the mobile terminal in a wireless network, in which the mobile terminal can automatically configure an IP version 6 (IPv6) address, transmit the automatically-configured IPv6 address to an access router, notify the access router by using the notification message, and allocate the IPv6 address to an interface in order to automatically configure a reliable IPv6 address, and use the IPv6 address.

According to an aspect of exemplary embodiments of the present invention, there is provided an IP address notification method in which a mobile terminal notifies an access router of an IP address of the mobile terminal. The method includes performing duplicate address detection (DAD) with respect to an automatically-configured IP address, and transmitting, to the access router, a notification message including the IP address resulting from the performing of the DAD, and notifying the access router by using the notification message, wherein the mobile terminal uses the IP address, based on whether there is a response with respect to the notification message transmitted to the access router after the performing of the DAD.

According to another aspect of exemplary embodiments of the present invention, there is provided a mobile terminal for notifying an access router of an IP address of the mobile terminal. The mobile terminal includes a detector performing DAD with respect to an automatically-configured IP address, a controller generating a notification message including the IP address resulting from the performing of the DAD by the detector, and a transmitter/receiver where the notification message is inputted from the controller, and which transmits the inputted notification message to the access router. The mobile terminal uses the IP address, based on whether there is a response with respect to the notification message transmitted to the access router after the performing of the DAD.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters exemplified in this description, such as a detailed construction and elements, are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

It is assumed that a mobile terminal for notifying an access router of an Internet protocol (IP) address of the mobile terminal according to exemplary embodiments of the present invention may be realized into any one of a mobile communication terminal, a public switched telephone network (PSTN) terminal, a voice over Internet protocol (VoIP), a session initiation protocol (SIP) terminal, a media gateway controller (Megaco) terminal, a personal digital assistant (PDA), a cellular phone, a personal communication service (PCS) phone, a hand-held personal computer (PC), a code division multiple access (CDMA)-2000(1X, 3X) phone, a wideband CDMA (WCDMA) phone, a dual band/dual mode phone, a global system for mobile communication (GSM) phone, a mobile broadband system (MBS) phone, and a satellite/terrestrial digital multimedia broadcasting (DMB) phone.

Figure 1:
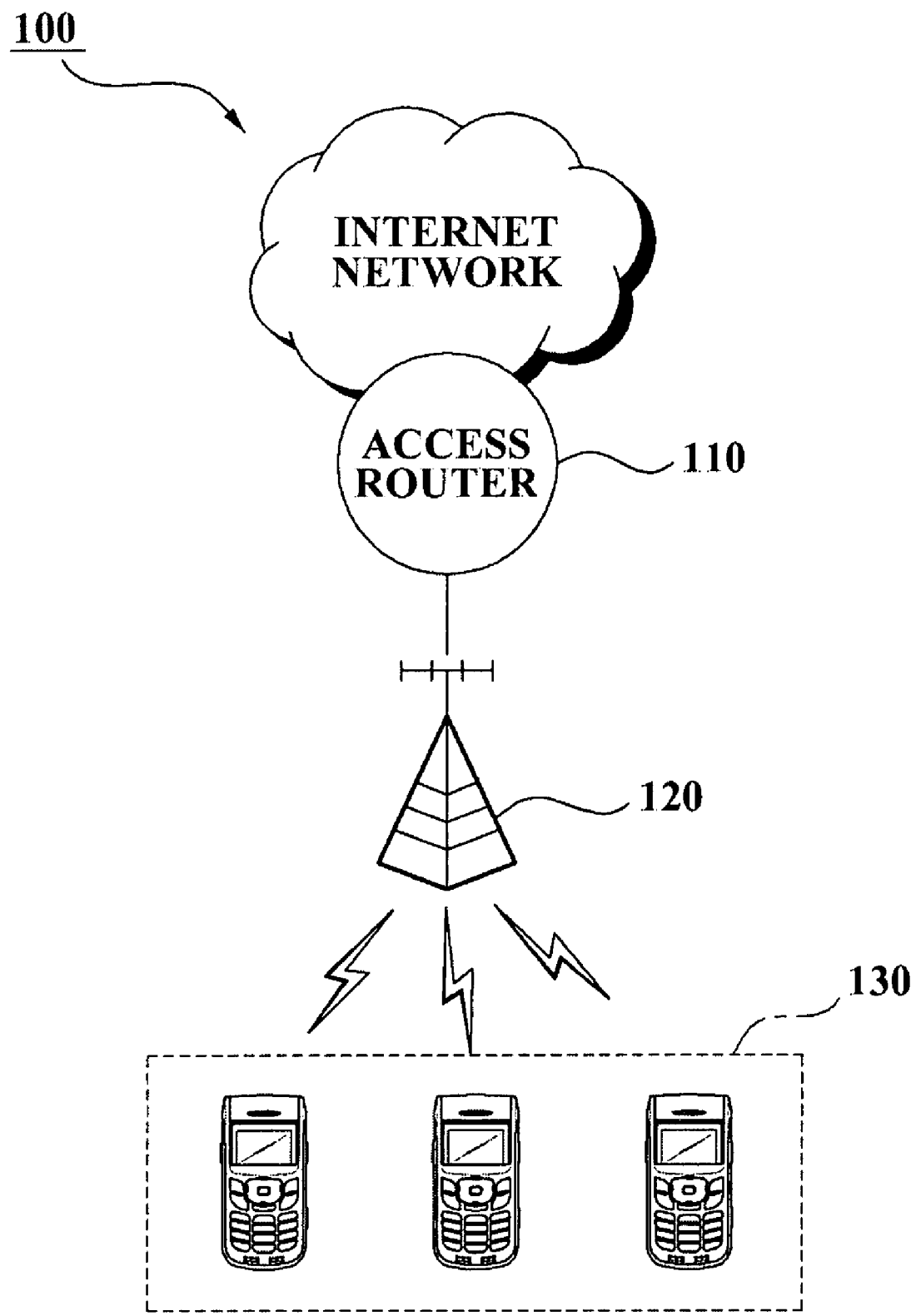
FIG. 1 is a configuration diagram illustrating a wireless network based on Internet protocol version 6 (IPv6) according to an exemplary embodiment of the present invention.

FIG. 1 is a configuration diagram illustrating a wireless network based on Internet protocol version 6 (IPv6) according to an exemplary embodiment of the present invention.

As illustrated in FIG. 1, a wireless network 100 based on IPv6 according to the exemplary embodiment of the present invention may include an access router 110 connecting with an Internet network, a base station 120, and a mobile terminal 130.

The mobile terminal 130 may automatically configure an IP address, and perform duplicate address detection (DAD) with respect to the configured IP address via the base station 120. The mobile terminal 130 may transmit, to the access router 110, a notification message including the automatically-configured IP address resulting from the performing of the DAD, and notify the access router by using the notification message. The mobile terminal 130 may validly use the automatically-configured IP address when the mobile terminal 130 receives the approval message corresponding to a response with respect to the notification message.

The base station 120 may generate a request message for requesting the DAD with respect to the automatically-configured IP address according to a request of the mobile terminal 130, and broadcast the generated request message. The base station 120 may check whether a response message corresponding to a response with respect to the request message is received, determine whether there is the same IP address as the automatically-configured IP address, and then report a result of the determining to the mobile terminal 130.

The access router 110 may check whether the IP address included in the received notification message exists in an address cache which the access router 110 manages when the access router 110 receives the notification message. The access router 110 may store the IP address message in the address cache when the IP address does not exist in the address cache, and transmit, to the mobile terminal 130, the approval message corresponding to a response with respect to the notification message.

Figure 2:
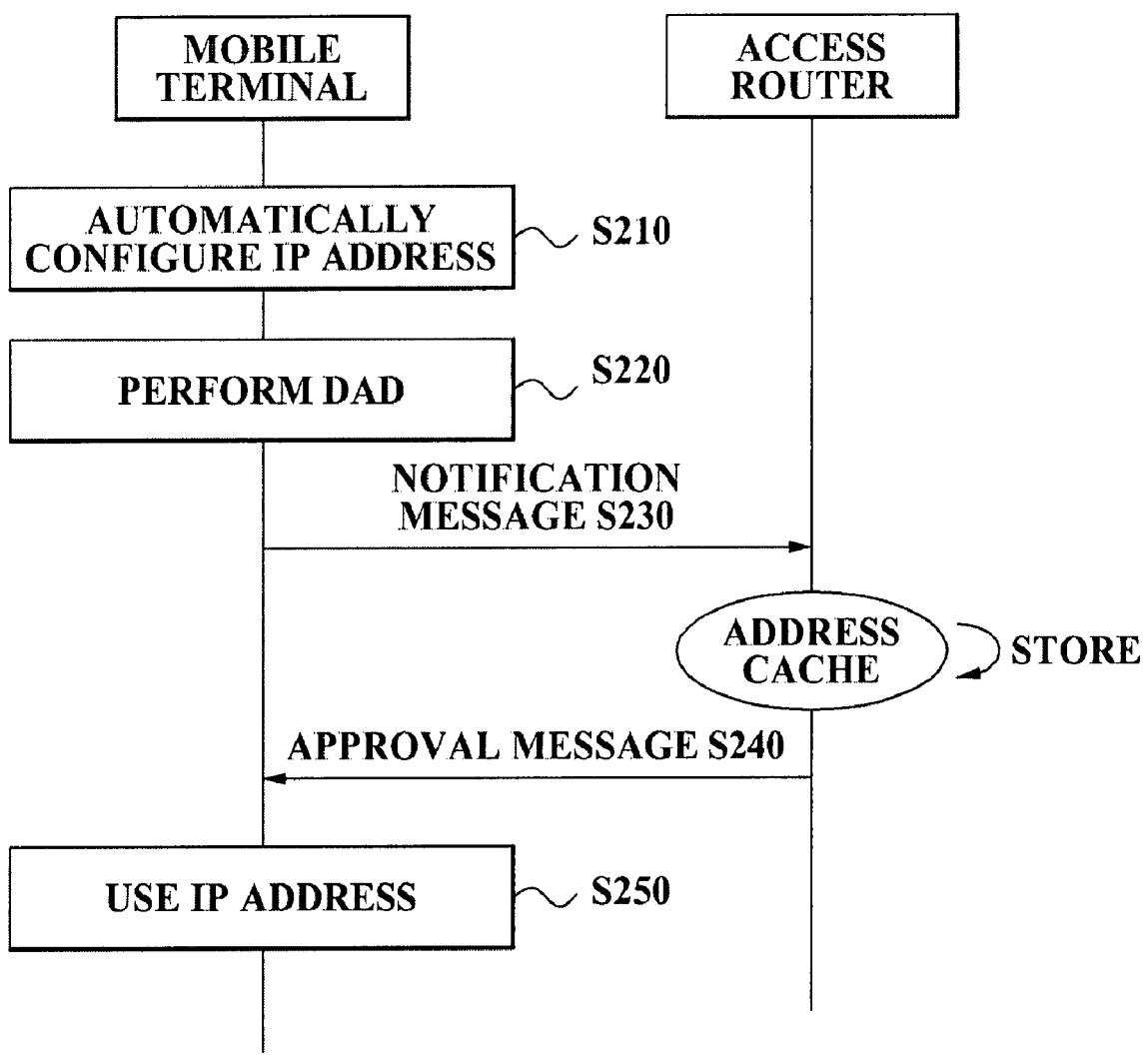
FIG. 2 is a flowchart illustrating a method which a mobile terminal notifies an access router of an IP address of the mobile terminal in a wireless network according to an exemplary embodiment of the present invention.

FIG. 2 is a flowchart illustrating a method which a mobile terminal notifies an access router of an IP address of the mobile terminal in a wireless network according to an exemplary embodiment of the present invention.

As illustrated in FIG. 2, the method which the mobile terminal notifies the access router of the IP address of the mobile terminal in the wireless network according to an exemplary embodiment of the present invention may include automatically configuring an IP address (S210), performing DAD (S220), transmitting a notification message (S230), receiving an approval message (S240), and validly using the IP address (S250).

The method which the mobile terminal notifies the access router of the IP address of the mobile terminal in the wireless network according to an exemplary embodiment of the present invention is described in detail below.

Referring to FIGS. 1 and 2, first, the mobile terminal 130 may automatically configure an IP address (S210), and perform DAD with respect to the automatically-configured IP address (S220). For example, the mobile terminal 130 may automatically configure an IP address according to an IPv6 address system, and request, to the base station 120, DAD with respect to the automatically-configured IP address. The base station 120 may generate a request message for requesting the DAD with respect to the IP address and broadcast the generated request message.

The base station 120 may check whether a response message corresponding to a response with respect to the request message is received, determine whether there is the same IP address as the automatically-configured IP address and report a result of the determining to the mobile terminal 130.

The mobile terminal 130 may transmit, to the access router 110, a notification message including the automatically-configured IP address resulting from the performing of the DAD and notify the access router by using the notification message (S230). Specifically, the mobile terminal 130 may transmit, to the access router 110, the notification message including the IP address when another mobile terminal using the same IP address as the automatically-configured IP address of the mobile terminal does not exist.

Also, the mobile terminal 130 may use the automatically-configured IP address when the mobile terminal 130 receives the approval message corresponding to a response with respect to the notification message transmitted to the access router 110 without immediately using the automatically-configured IP address after the performing of the DAD.

Conversely, the mobile terminal 130 may discard the automatically-configured IP address when another mobile terminal using the same IP address as the automatically-configured IP address of the mobile terminal exists. Here, the notification message may include an Internet control message protocol version 6 (ICMPv6) neighbor solicitation (NS) message defined in a neighbor discovery protocol for IPv6. Also, a format of the notification message is described with reference to FIG. 3.

Figure 3:
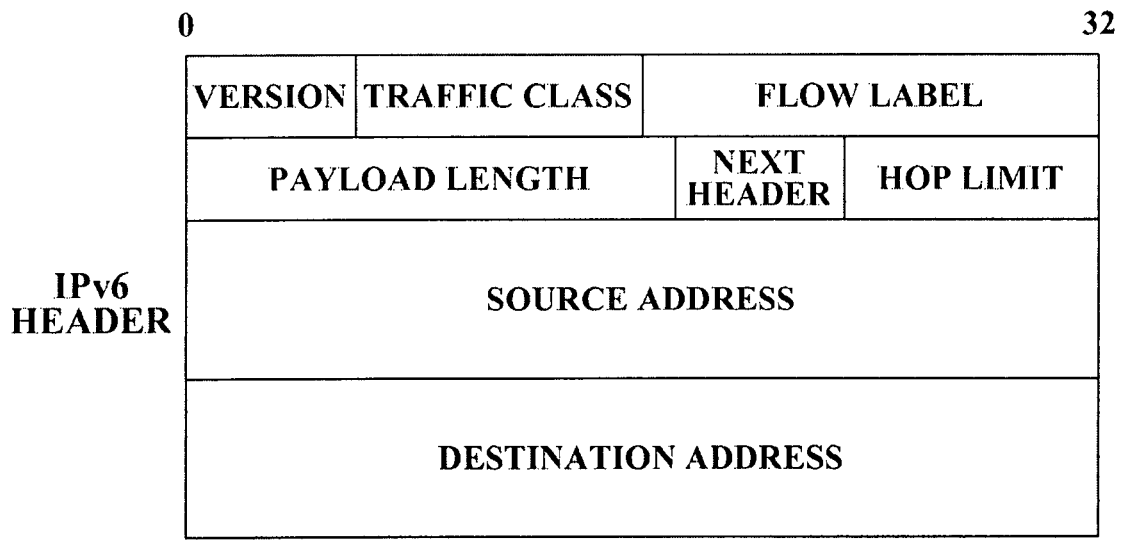
FIG. 3 is a diagram illustrating a format of a notification message according to an exemplary embodiment of the present invention.
Figure 3:
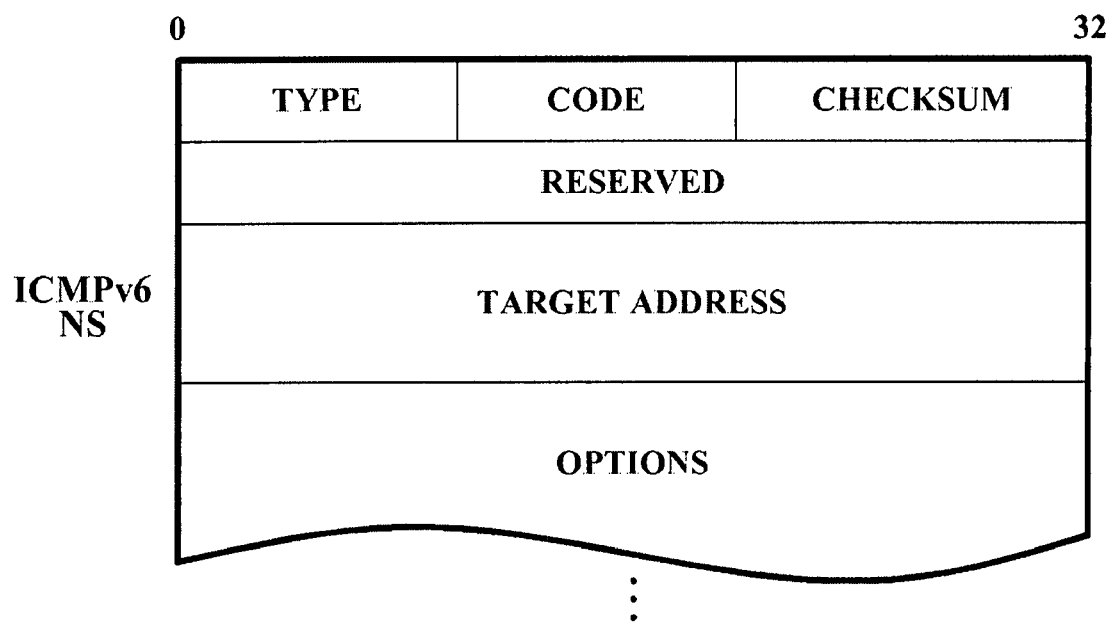

FIG. 3 is a diagram illustrating a format of a notification message according to an exemplary embodiment of the present invention.

As illustrated in FIG. 3, the notification message according to an exemplary embodiment of the present invention may include an IPv6 header and an ICMPv6 NS message. The ICMPv6 NS message may include a type field describing a type of a message, a code field describing an additional code provided for each of the types of the messages, a checksum field for checksum calculation, a reserved field which is unused, a target address field for a target IP address of the message and an option field for an option.

For example, the mobile terminal 130 may generate a notification message including an IPv6 header and an ICMPv6 NS message, and transmit the generated notification message to the access router 110. Specifically, the notification message may contain a plurality of address fields, and the IP address of the access router 110 may be configured in a destination address field, the automatically-configured IP address may be configured in a source address field, the IP address of the access router 110 may be configured in a target address field, and a link-layer address of the mobile terminal 130 may be configured in a source link-layer address field.

In this instance, since the access router 110 may store, in the address cache, the IP address configured in a plurality of mobile terminals, and manage the IP address, the access router 110 may check whether the IP address included in the received notification message exists in the address cache which the access router 110 manages when access router 110 receives the notification message. Specifically, the access router 110 may store the IP address in the address cache when the IP address does not exist in the address cache, and transmit, to the mobile terminal 130, the approval message corresponding to the response with respect to the notification message. Here, the approval message may include an ICMPv6 neighbor advertisement (NA) message defined in a neighbor discovery protocol for IPv6, and a format of the approval message is described with reference to FIG. 4.

Figure 4:
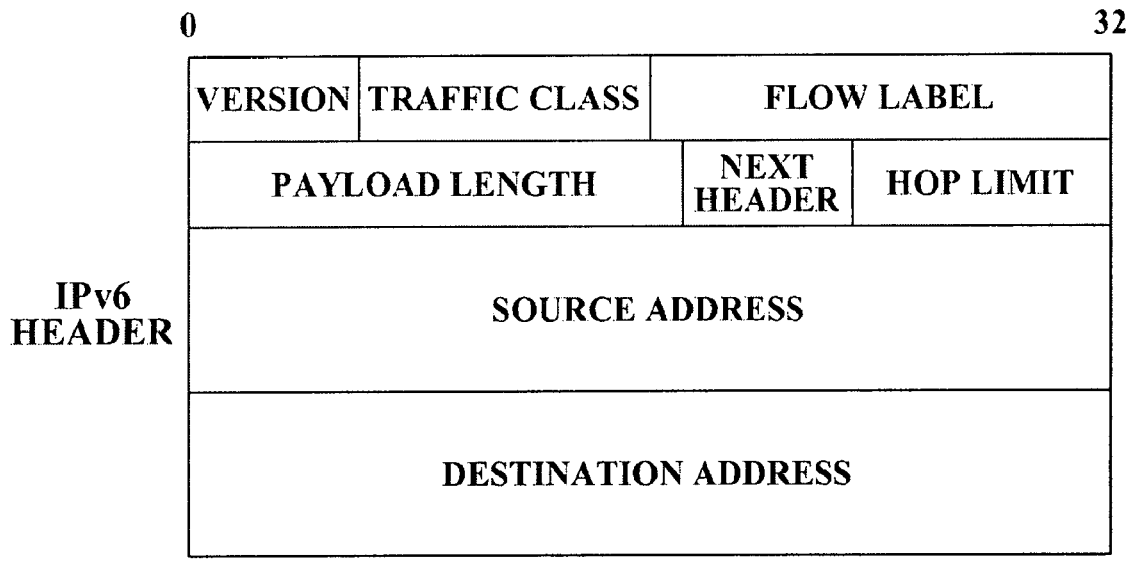
FIG. 4 is a diagram illustrating a format of an approval message according to an exemplary embodiment of the present invention.
Figure 4:
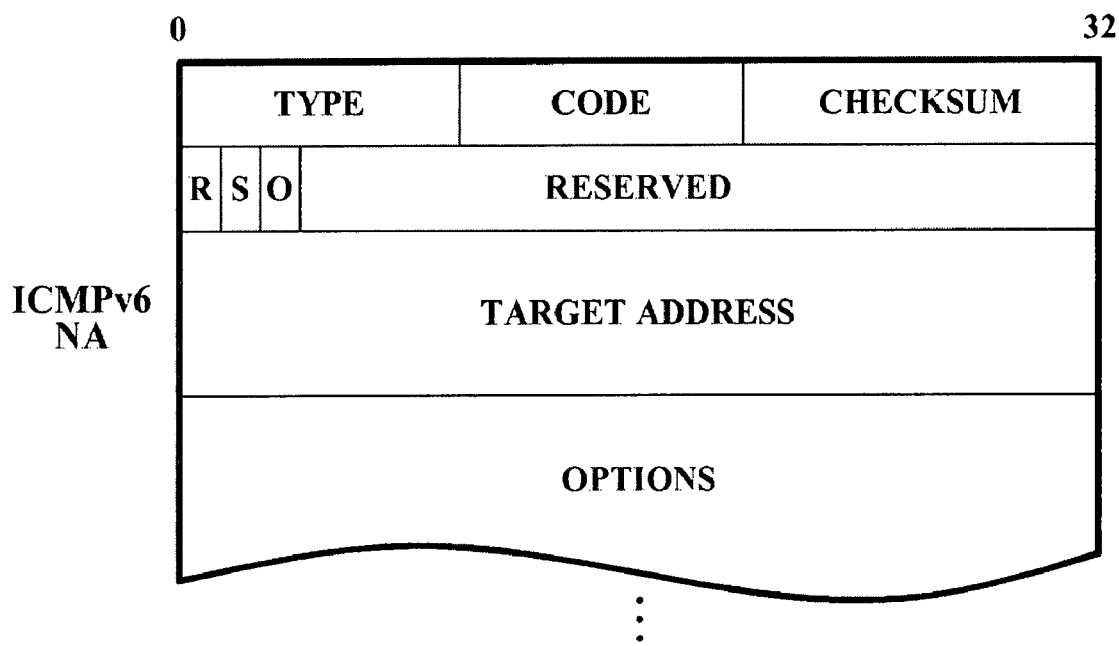

FIG. 4 is a diagram illustrating a format of an approval message according to an exemplary embodiment of the present invention.

As illustrated in FIG. 4, the approval message according to the exemplary embodiment of the present invention includes an IPv6 header and an ICMPv6 NA message. The ICMPv6 NA message may include a type field describing a type of a message, a code field describing an additional code provided for each of the types of the messages, a checksum field for checksum calculation, an R field for describing that a transmitter is the access router, a S field for describing a response with respect to the NS message, an O field for describing that an existing cache entry is required to override, a reserved field which is unused, a target address field for a target IP address of the message, and an option field for an option.

For example, the access router 110 may generate an approval message including an IPv6 header and an ICMPv6 NA message, and transmit the generated approval message to the mobile terminal 130. Specifically, the approval message may contain a plurality of address fields, and the automatically-configured IP address may be configured in a destination address field, the IP address of the access router 110 may be configured in a source address field, the IP address of the access router 110 may be configured in a target address field, and a link-layer address of the access router 110 may be configured in a source link-layer address field.

Conversely, the access router 110 performs no action when the IP address exists in the address cache.

Next, the mobile terminal 130 checks whether an approval message corresponding to a response with respect to the notification message is received (S240). Specifically, the mobile terminal 130 may check whether the approval message is received in response to the notification message for a predetermined period of time, for example, established as one second for reflecting a network status after transmitting the notification message.

Therefore, the mobile terminal 130 may validly use the automatically-configured IP address depending on whether the approval message is received. Specifically, the mobile terminal 130 may validly use the IP address when the approval message is received, and discard the IP address when the approval message is not received.

Also, the mobile terminal 130 may repeatedly transmit the notification message up to a predetermined number of times, for example, established as three times for reflecting the network status, when the approval message is not received, and then discard the IP address when the approval message is still not received as a result of the transmitting.

Figure 5:
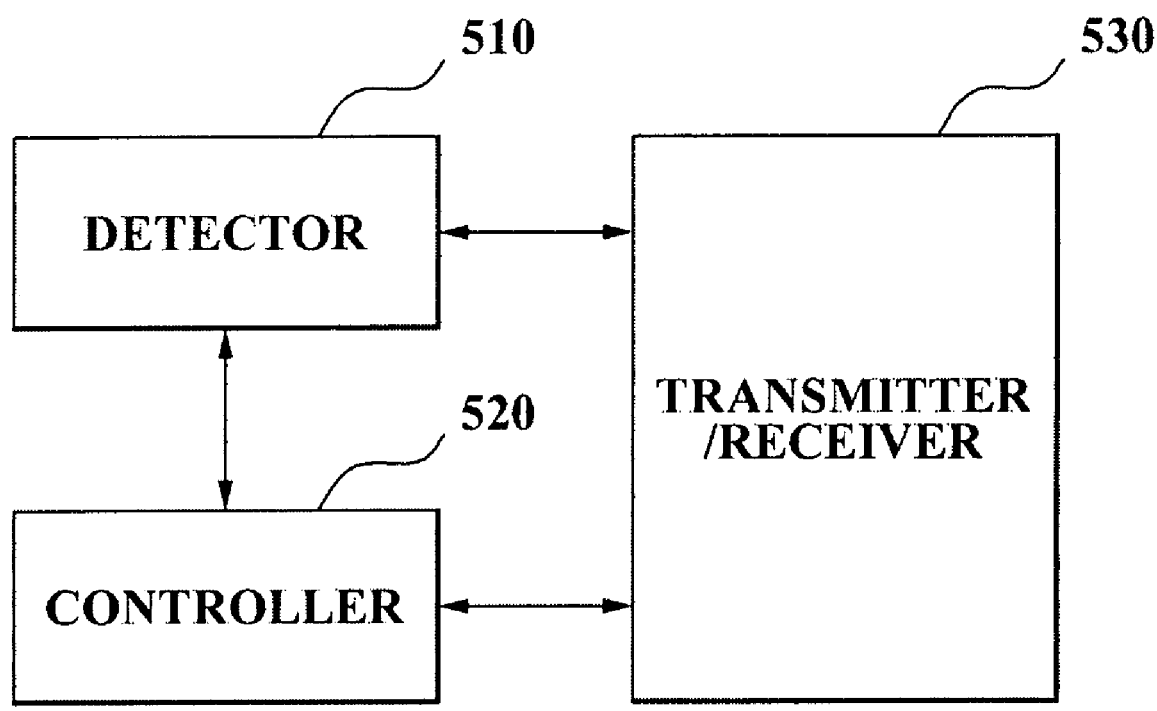
FIG. 5 is a configuration diagram illustrating a mobile terminal for notifying an access router of an IP address of the mobile terminal in a wireless network according to an exemplary embodiment of the present invention.

FIG. 5 is a configuration diagram illustrating a mobile terminal for notifying an access router of an IP address of the mobile terminal in a wireless network according to an exemplary embodiment of the present invention.

As illustrated in FIG. 5, the mobile terminal for notifying the access router of the IP address of the mobile terminal in the wireless network according to an exemplary embodiment of the present invention may include a detector 510, a controller 520, and a transmitter/receiver 530.

The detector 510 may perform DAD with respect to an automatically-configured IP address. Specifically, the detector 510 may request the performing of the DAD to a base station, and provide the controller 520 with a result of the performing of the requested DAD.

The controller 520 may generate a notification message including the automatically-configured IP address resulting from the performing of the DAD, transmit the generated notification message to the access router via the transmitter/receiver 530, and notify the access router by using the notification message. Specifically, the controller 520 may transmit, to the access router, the notification message including the IP address when another mobile terminal using the same IP address as the IP address of the mobile terminal does not exist, and notify the access router by using the notification message. Also, the controller 520 may discard the IP address when another mobile terminal using the same IP address as the IP address of the mobile terminal exists.

Also, the controller 520 may validly use the IP address when the approval message is inputted from the transmitter/receiver 530, and discard the IP address when the approval message is not inputted.

The notification message is inputted in the transmitter/receiver 530 from the controller 520, and the transmitter/receiver 530 transmits the inputted notification message to the access router, and receives an approval message corresponding to a response with respect to the transmitted notification message. Here, the approval message is inputted in the controller 520 from the transmitter/receiver 530, and may determine whether the IP address is used depending on whether the approval message is inputted.

The exemplary embodiments of the present invention may include computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to exemplary embodiments of the preset invention, there is provided a mobile terminal and method of notifying an access router of an IP address of the mobile terminal in a wireless network, in which the mobile terminal can automatically configure an IPv6 address, transmit the auto-matically-configured IPv6 address to an access router, notify the access router by using the notification message, and validly use the IPv6 address, thereby automatically configuring a reliable IPv6 address and using the IPv6 address.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An Internet protocol (IP) address notification method comprising:
    performing duplicate address detection (DAD) with respect to an automatically-configured IP address;
    transmitting, to an access router, a notification message including an IP address resulting from the performing of the DAD;
    notifying the access router using the notification message;
    checking whether an approval message is received in response to the transmitted notification message; and
    using the automatically-configured IP address based on the checking,
    wherein the using comprises using the IP address when the approval message is received and discarding the IP address when the approval message is not received, and the discarding comprises repeatedly transmitting the notification message a certain number of times and discarding the IP address after transmitting the notification message a certain number of times.

2. The method of claim 1, wherein the transmitting and notifying comprises:
    transmitting, to the access router, the notification message including the IP address when another mobile terminal using the same IP address as the IP address of the mobile terminal does not exist; and
    discarding the IP address when another mobile terminal using the same IP address as the IP address of the mobile terminal exists.

3. The method of claim 1, wherein the notification message comprises a neighbor solicitation (NS) message defined in a neighbor discovery protocol for Internet protocol version 6 (IPv6).

4. The method of claim 1, wherein the approval message comprises a neighbor advertisement (NA) message defined in a neighbor discovery protocol for IPv6.

5. The method of claim 1, wherein, the access router checks whether the IP address included in the notification message exists in an address cache which the access router manages, stores the automatically-configured IP address in the address cache when the automatically-configured IP address does not exist, and transmits the approval message.

6. A computer-readable recording medium storing a program comprising:
    a first set of instructions for performing duplicate address detection (DAD) with respect to an automatically-configured IP address;
    a second set of instructions for transmitting, to an access router, a notification message including an IP address resulting from the performing of the DAD;
    a third set of instructions for notifying the access router using the notification message;
    a fourth set of instructions for checking whether an approval message is received in response to the transmitted notification message; and
    a fifth set of instructions for using the automatically-configured IP address based on the checking,
    wherein the using comprises using the IP address when the approval message is received and discarding the IP address when the approval message is not received, and the discarding comprises repeatedly transmitting the notification message a certain number of times and discarding the IP address after transmitting the notification message a certain number of times.

7. A mobile terminal for notifying an access router of an IP address of the mobile terminal, the mobile terminal comprising:
    a detector for performing DAD with respect to an automatically-configured IP address;
    a controller for generating a notification message including the IP address resulting from the performing of the DAD by the detector;
    a transmitter/receiver, where the notification message is input from the controller for transmitting the input notification message to the access router,
    wherein the transmitter/receiver receives an approval message corresponding to a response with respect to the transmitted notification message, and
    the controller uses the automatically-configured IP address according to the approval message input from the transmitter/receiver,
    wherein the controller uses the automatically-configured IP address when the approval message is input, and when the approval message is not input, the controller repeatedly transmits the notification message via the transmitter/receiver a certain number of times and discards the automatically-configured IP address after repeatedly transmitting the notification message a certain number of times.

8. The mobile terminal of claim 7, wherein the controller transmits to the access router, via the transmitter/receiver, the notification message including the IP address when another mobile terminal using the same IP address as the IP address of the mobile terminal does not exist, and notifies the access router using the notification message; and discards the IP address when another mobile terminal using the same IP address as the IP address of the mobile terminal exists.

9. The mobile terminal of claim 7, wherein the notification message comprises an NS message defined in a neighbor discovery protocol of IPv6.

10. The mobile terminal of claim 7, wherein the approval message comprises an NA message defined in a neighbor discovery protocol of IPv6.

11. The mobile terminal of claim 7, wherein the controller transmits the notification message to the access router, and notifies the access router using the notification message.

12. The mobile terminal of claim 7, wherein the mobile terminal corresponds to at least one of a mobile communication terminal, a public switched telephone network (PSTN) terminal, a voice over Internet protocol (VoIP), a session initiation protocol (SIP) terminal, a media gateway controller (Megaco) terminal, a personal digital assistant (PDA), a cellular phone, a personal communication service (PCS) phone, a hand-held personal computer (PC), a code division multiple access (CDMA)-2000(1X, 3X) phone, a wideband CDMA (WCDMA) phone, a dual band/dual mode phone, a global system for mobile communication (GSM) phone, a mobile broadband system (MBS) phone, and a satellite/terrestrial digital multimedia broadcasting (DMB) phone.

* * * * *